Aug. 14, 1945.    I. R. TREVISAN    2,382,589
WHEEL ASSEMBLY
Filed Dec. 21, 1943
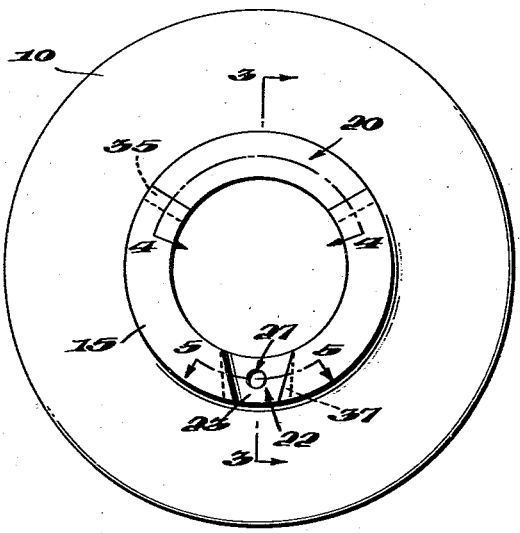
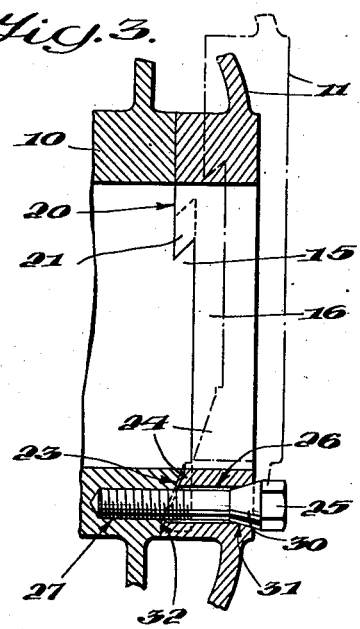
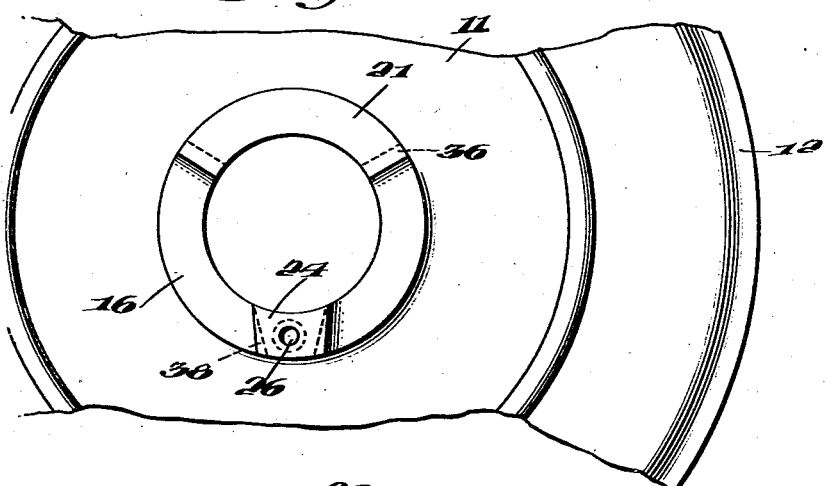
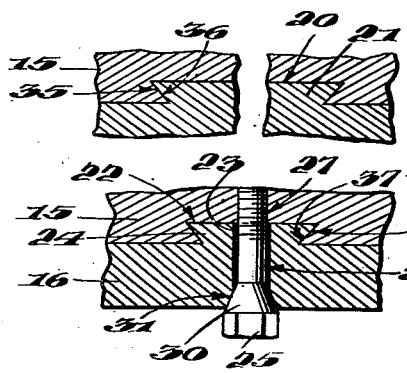
Inventor
ITALO RAYMOND TREVISAN,
By George W. Reiber
Attorney Patented Aug. 14, 1945

2,382,589

UNITED STATES PATENT OFFICE 2,382,589

WHEEL ASSEMBLY

Italo Raymond Trevisan, Newark, N. J.

Application December 21, 1943, Serial No. 515,138

5 Claims. (Cl. 301—9)

The present invention relates in general to interlocking means between rotary power transmitting elements and particularly to interlocking means of this character in a wheel assembly, such as that of an automobile wheel and its driving hub whereby the wheel may be quickly removed from or replaced on the hub.

The present conventional structure of automobile wheel and hub includes the provision of a plurality of studs in the hub projecting outwardly therefrom and adapted to align with and pass through holes formed in the wheel. In mounting this wheel on its hub, it is first necessary to hold the wheel up and turn it until the above mentioned holes align with the studs, then to move the wheel in over the studs, apply a nut to each of the several studs, and finally, screw each of the nuts securely home. The process thus briefly stated is well known to be time-consuming and tedious.

It is an object of the present invention to provide interlocking means between an automobile wheel and its hub, or between similar mechanical elements whereby those elements may be quickly detached or secured together.

Another object of the invention is the provision of dovetailing and wedging means in a device of this nature whereby the elements are drawn into a secure interlocking relation capable of transmitting power in forward or reverse rotation as well as resisting lateral thrusts.

A further object of the invention is the provision of a plurality of interlocking elements of the character above mentioned which are adapted to make successive initial inter-engagement.

Numerous other objects and advantages of the invention will be apparent as it is better understood from the following description which, taken together with the accompanying drawing, discloses a preferred embodiment thereof.

In the drawing:

Fig. 1 is a side elevational view of a driving hub of an automobile wheel assembly showing an interlocking member of the present invention;

Fig. 2 is an elevational view of the wheel of said assembly embodying another interlocking member adapted to engage the above mentioned hub member;

Fig. 3 is a sectional view on a larger scale taken along the line 3—3 in Fig. 1 with the interlocking parts of Figs. 1 and 2 facing each other and assembled;

Fig. 4 is a sectional view of elements of the assembled parts taken along the line 4—4 in Fig. 1; and Fig. 5 is a sectional view of other elements of the assembled parts taken along the line 5—5 in Fig. 1.

Referring to the drawing, the numeral 10 indicates generally a hub or drum of an automobile wheel assembly and the numeral 11 similarly indicates a wheel with tire 12 attached. Hub 10 may be either a power driven or idler hub rotatably secured on the chassis of the automobile in any well known manner. The hub is provided with a concentric interlocking ring 15, and wheel 11 is provided with a complementary interlocking ring 16 adapted to align axially with and engage ring 15 as shown in Fig. 3.

Rings 15 and 16 may be formed integrally with the hub and wheel respectively, as shown, but the invention also contemplates the provision of separate interlocking members in the form of rings, segments, blocks, and the like attachable to standard hubs and wheels. For instance, the hub interlocking member may be provided with securing means adapted to cooperate with the standard hub studs, and the wheel interlocking member with securing means utilizing the holes in the wheel alignable with the hub studs. The cooperating interlocking members could thus be secured to their respective hubs and wheels so as to become substantially integrated therewith.

In the preferred embodiment of the invention illustrated in the drawing, the hub ring is formed with an arcuate socket, or mortise, dovetail element 20 adapted to receive and retain a complementary tongue, or tenon, 21 formed in the wheel ring 16.

The hub ring is also provided with a locking socket, or mortise, 22 having a rear wall 23 inclined radially outwardly and downwardly as viewed in Fig. 1. A wedge-shaped tongue, or tenon, 24 on wheel ring 16 is complementary to socket 22 and is adapted to be retained in the socket by a taper-headed screw or bolt 25 which passes loosely through a hole 26 in ring 16 and threadedly engages a tapped hole 27 in ring 15.

It is to be understood that the term "dovetail" as applied to the interlocking members herein shall and does include, not only the well-known dovetail formation of socket and tongue shown, with slight modification in the accompanying drawing, wherein the interlocking walls engage along a line of cleavage approximating the form of the letter Z, but also formations where the comparative line of cleavage takes other forms which produce an interlocking and/or keying of the parts effective whether rotation of the wheel is clockwise or counterclockwise.

The procedure in assembling the wheel on its hub is suggested in Fig. 3 wherein the dot and dash outline of the interlocking members of the wheel show their positions immediately preceding initial contact. Obviously, the tongue 24 will engage and enter hub socket 22 before tongue 21 engages socket 20 in initial contact as the wheel is moved inwardly and downwardly to the interlocked position. This successive engagement of interlocking parts lends facility to the mounting operation. The invention, however, also contemplates simultaneous engagement of the interlocking members.

When tongues 21 and 24 come to rest within their respective sockets, hole 26 will be aligned substantially with the tapped hole 27, but it and ring 16 may be slightly above true axial alignment at that time due, for instance, to friction between the interlocking parts. However, even when this is so, the diameter of hole 26 being slightly larger than the diameter of the body of bolt 25, the latter may be passed through the hole and into threaded engagement with the tapped hole 27. When thus started, the screw is turned until its conical surface 30 engages a complementary conical countersunk hole wall 31 in the ring 16. Further turning in the same direction effects alignment of the rings 15 and 16 and the forcing home of the interlocking tongues in their sockets due to the combined downward urging of ring 15 relative to ring 16 by engagement of the conical surface 30 of the bolt with the conical wall 31 simultaneous with engagement of an inclined face 32 of wedge tongue 24 with face 23 of socket 22. Thus, one screw or bolt serves to align, seat and lock securely the interlocking rings 15 and 16.

When torque is applied to the wheel through its hub in a clockwise direction as viewed in Fig. 1, power is transmitted through the interlocking members principally between beveled walls 35, 36 of socket 20 and tongue 21, respectively; and between beveled walls 37, 38 of socket 22 and tongue 24 respectively. Obviously, reversal of the torque transfers this driving pressure to similarly beveled walls on the opposite sides of the said interlocking sockets and tongues. Thus, substantially equal distribution of driving pressure is effected over the pressure-transmitting surfaces of the interlocking rings whether the automobile, of which the wheel is a part, is driven forward or in reverse.

It is also to be observed that the bevel wall engagement above mentioned provides an increased wedging action when under driving pressure, whereby the rings are urged toward each other with greater force, adding to the security of the mounting.

The dismounting of wheel 11 from its hub or drum 10 is effected by reversing the above described mounting procedure. Bolt 25 is first loosened and removed, and the wheel is then moved away from the hub in an oblique line to disengage the interlocking elements.

It is thought that the invention and many of its attendant advantages will be understood from the foregoing description and it will be apparent that various changes may be made in the form construction and arrangement of the parts without departing from the spirit and scope of the invention or sacrificing all of its material advantages, the form hereinbefore described being merely a preferred embodiment thereof.

I claim:

1. A wheel assembly comprising a hub member, a wheel member separable from said hub member, interlocking dovetail elements on said members, and an axially extending tongue on one of said members having dovetail portions cooperable with corresponding portions on the other of said members, including said tongue, for drawing said assembly into interlocked relation.

2. A wheel assembly comprising a hub member, a wheel member separable from said hub member, complementary interlocking elements, said elements being located on opposite sides of the axis of said assembly, and axially disposed means associated with said elements for drawing said assembly into interlocked engagement.

3. A wheel assembly comprising a driving member and a driven member separable substantially along principal cleavage planes normal to the axis of said assembly, dovetailed tongues and sockets formed in said members, the bottom surface of one socket and its complementary tongue surface being inclined generally at an acute angle to said principal cleavage planes, one of said inclined elements being formed with a threaded hole therein and the other with an outwardly diverging conical hole aligned, when in locking position, with said threaded hole, and a locking member adapted to engage said inclined tongue and socket elements in said threaded and conical holes, whereby said assembly is drawn into secure interlocking engagement.

4. A wheel assembly comprising a driving member and a driven member separable substantially along principal cleavage planes generally normal to the axis of the assembly, dovetailed tongues and sockets formed in said members, the bottom surface of one socket and its complementary tongue surface being inclined generally at an acute angle to said principal cleavage planes and initially engageable obliquely to said principal cleavage planes before initial engagement of the remainder of said interlocking elements.

5. In an automobile wheel assembly comprising a hub, or driving member, and a wheel, or driven member; the combination of a driving interlocking member on said hub; a driven interlocking member on said wheel complementary to said driving interlocking member and adapted to cooperate therewith in a dovetail and wedge connection; and means including axially disposed conical interengaging surfaces to draw and lock said members into interlocked engagement.

ITALO RAYMOND TREVISAN.